US008295879B2

(12) United States Patent
Alameh et al.

(10) Patent No.: US 8,295,879 B2
(45) Date of Patent: Oct. 23, 2012

(54) DEVICES AND METHODS FOR INITIATING FUNCTIONS BASED ON MOVEMENT CHARACTERISTICS RELATIVE TO A REFERENCE

(75) Inventors: Rachid M Alameh, Crystal Lake, IL (US); Francis W Forest, Lake Villa, IL (US); William S Hede, Lake in the Hills, IL (US); Mark R Lemke, Mundelein, IL (US); Robert S Witte, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1023 days.

(21) Appl. No.: 12/129,903

(22) Filed: May 30, 2008

(65) Prior Publication Data

US 2009/0298533 A1 Dec. 3, 2009

(51) Int. Cl.
*H04M 1/02* (2006.01)

(52) U.S. Cl. ................. 455/556.1; 455/344; 340/539.13

(58) Field of Classification Search ............... 455/556.1, 455/344; 340/539.13, 990; 345/169
See application file for complete search history.

(56) References Cited

U.S. PATENT DOCUMENTS

| 5,656,804 | A | 8/1997 | Barkan et al. |
| 6,424,843 | B1 | 7/2002 | Reitmaa et al. |
| 7,036,091 | B1 | 4/2006 | Nguyen |
| 7,194,816 | B2* | 3/2007 | Tamura ................... 33/355 R |
| 7,289,102 | B2 | 10/2007 | Hinckley et al. |
| 2002/0158812 | A1 | 10/2002 | Pallakoff |
| 2003/0085870 | A1 | 5/2003 | Hinckley |
| 2004/0077381 | A1 | 4/2004 | Engstrom |
| 2004/0212617 | A1 | 10/2004 | Fitzmaurice et al. |
| 2004/0214594 | A1 | 10/2004 | Holman, IV |
| 2004/0259591 | A1 | 12/2004 | Grams et al. |
| 2006/0062382 | A1 | 3/2006 | Ronkainen |
| 2006/0240872 | A1 | 10/2006 | Yuan et al. |

(Continued)

FOREIGN PATENT DOCUMENTS

EP 0825514 B1 10/2003

(Continued)

OTHER PUBLICATIONS

Patent Cooperation Treaty; Notification of Transmittal of the International Search Report and the Written Opinion of the International Searching Authority, or the Declaration; International Application No. PCT/US2009/045548; International Filing Date May 29, 2009; Date of Mailing Dec. 3, 2009; 11 pages.

(Continued)

*Primary Examiner* — Phuoc Doan

(57) ABSTRACT

Disclosed are devices and methods of an electronic device configured to adaptably process arbitrary conditions to provide a user options for initiating or activating a non-display electronic function of the device. A user is free to determine how to position or orient the device. To determine in real-time, arbitrary conditions of the device, the disclosed devices and methods of an electronic device include determining that the electronic device is at rest and then acquiring a reference in response to determining that the electronic device is at rest. In this way, the device may assume any position or orientation to acquire a reference. Subsequently, subtle movement of the electronic device relative to the acquired reference may be detected to initiate a non-display electronic function of the electronic device. The user therefore may make choices inconspicuously and privately as to which non-display electronic function to initiate.

22 Claims, 12 Drawing Sheets

U.S. PATENT DOCUMENTS

| | | |
|---|---|---|
| 2007/0124677 A1 | 5/2007 | de los Reyes et al. |
| 2007/0172953 A1 | 7/2007 | Shim |
| 2007/0271528 A1 | 11/2007 | Park et al. |
| 2008/0244454 A1 | 10/2008 | Shibaike |
| 2009/0013254 A1 | 1/2009 | Walker et al. |
| 2009/0098907 A1* | 4/2009 | Huntzicker et al. ....... 455/556.1 |
| 2010/0090971 A1 | 4/2010 | Choi et al. |

FOREIGN PATENT DOCUMENTS

| | | |
|---|---|---|
| EP | 1222518 B1 | 5/2004 |
| EP | 1818766 A1 | 8/2007 |
| WO | 2005027363 A1 | 3/2005 |

OTHER PUBLICATIONS

Alameh et al., "Navigable User Interface for Electronic Handset" U.S. Appl. No. 12/622,157, filed Nov. 19, 2009, 27 pages.

GPX MW-3815 (256 MB) MP3 Player; www.epinions.com/GPX_MW_3815_256_MB_MP3_Player/content_224032820868 Nov. 7, 2008, 6 pages.

Patent Cooperation Treaty, "PCT Search Report and Written Opinion of the International Searching Authority" for International Application No. PCT/US2010/054005 Feb. 21, 2011, 12 pages.

United States Patent and Trademark Office, "Final Rejection" for U.S. Appl. No. 12/622,157 dated Jul. 19, 2012, 17 pages.

United States Patent and Trademark Office, "Non-Final Office Action" for U.S. Appl. No. 12/622,157 dated Mar. 1, 2012, 12 pages.

El-Shimy et al., "Eyes-free environmental awareness for navigation" Journal on Multimodal User Interfaces, Nov. 22, 2011, 11 pages.

Motorola, Inc.: "PageWriter 2000X User's Guide", 1999, Boynton Beach, FL. pp. 6-7.

* cited by examiner

VIBRATE — 841

FORWARD CALLS — 842

ALLOW PERSONAL CALLS — 843

RING LOUD — 844

SILENCE — 845

REPLY WITH BUSY MESSAGE — 846

CALL ME IN 10 MINUTES — 847

WEATHER — 848

NEWS — 849

CALENDER — 850

DEVICES AND METHODS FOR INITIATING FUNCTIONS BASED ON MOVEMENT CHARACTERISTICS RELATIVE TO A REFERENCE

FIELD

Disclosed are devices and methods of an electronic device to adaptably process arbitrary conditions to provide a user options for initiating or activating a non-display electronic function of the device, and more particularly, determining that the electronic device is at rest, acquiring a reference, determining motion with respect to the reference to initiating a non-display electronic function of the device.

BACKGROUND

Mobile communication devices, and in particular cellular telephones, are used by over 2 billion users in more than 212 countries and territories. For most mobile communication device users, their device is an integral part of their daily life. Users may utilize many different modes, applications and functions on their device. For example, a mobile communication device may not only include telephone capabilities, but may also include media playback capabilities, as well as features such as still and video cameras, video streaming and two-way video calling, email functionality, Internet browsers, e-commerce capabilities, FM radios with stereo audio and organizers. Bluetooth enabled cellular telephones may be PC compatible so that files generated or captured on the mobile communication device may be downloaded to a PC. Likewise, data from a PC or other source may be uploaded to the mobile communication device. Cellular telephones in particular are becoming more than simply mobile communication devices. They are evolving into powerful tools for information management.

Users of mobile communication devices most often utilize menus provided on their device's display screens to activate or initiate various non-display electronic functions such as modes, applications and functions of their device. In doing so, a user directs their attention to the display screen, and possibly navigates through several different menus to activate or initiate the desired mode, application or function of their device. In utilizing menus, or even a simply soft key press, the activation or initiation of a different mode, application or function may not be inconspicuous or private.

Sensors are increasingly becoming an integral part of mobile communication device technology for improving user interface and device interaction. Embedding various types of sensors to achieve additional functionalities is on the rise. Sensors of a device may include for example, sensors for proximity, force and/or touch, utilizing capacitive activation, accelerometers, and compasses. Sensors may be used by the device to determine particular conditions. That is, the sensors in general detect absolute conditions. For example, a sensor or plurality of sensors may detect predetermined absolute conditions such as a particular tilt or orientation of a device, a particular direction in which the device is pointing, and even the surroundings of the device. Based on a sensed predetermined absolute condition, a device can then activate and/or initiate a certain function. However, such a device is not adaptable in real-time to process arbitrary conditions to provide a user options for initiating or activating functions of the device.

DETAILED DESCRIPTION

Figure 1:
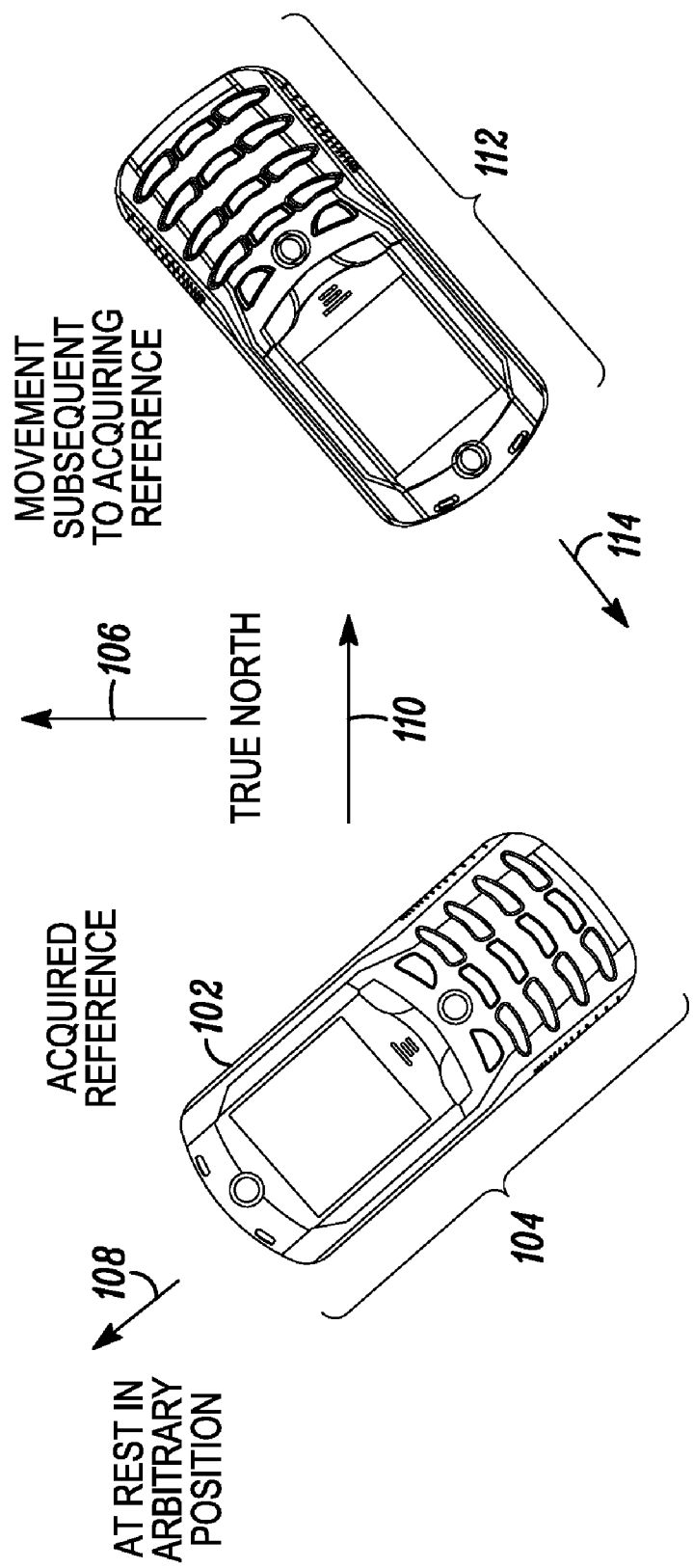
FIG. 1 depicts a mobile communication device at rest in a resting position so that it may acquire a reference, and further depicts movement of the device subsequent to acquiring a reference.

Disclosed are devices and methods of an electronic device configured to adaptably process arbitrary conditions to provide a user options for initiating or activating a non-display electronic function of the device. In this way, a user is not required to manipulate the device in a particular manner to activate a function. Instead, a user is free to determine how to position or orient the device. To determine in real-time, arbitrary conditions of the device, the disclosed devices and methods of an electronic device include determining that the electronic device is at rest and then acquiring a reference in response to determining that the electronic device is at rest. In this way, the device may assume any position or orientation to acquire a reference. Subsequently, movement of the electronic device relative to the acquired reference is detected to initiate a non-display electronic function of the electronic device. In this manner, real-time arbitrary conditions are adaptably processed so that a user is free to determine how to position or orient the device to initiate non-display electronic functions, and therefore may make choices as to which non-display electronic function to initiate inconspicuously and privately.

In one use case for example, a user may be in a meeting and place the device on the table in any arbitrary position or orientation. Such an action is common place and most likely would not draw attention to the action. In accordance with the disclosed devices and methods, the device may assume a resting position and then acquire a reference in response to the device determining that the device is at rest. The display may exhibit options, for example indicated by icons in a particular display arrangement, so that the user may chose to activate or initiate a mode, application or function by subtly moving the device relative to the previously acquired reference. The movement of the device by the user therefore may be rather inconspicuous and therefore the choice made by the user to initiate a non-display electronic function such as controlling incoming calls and device status may be made privately. In one situation, for example, a user may wish to be interrupted during a meeting. In that way, the user can inconspicuously move the device to receive incoming calls.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts a mobile communication device at rest in a resting position so that it may acquire a reference, and further depicts movement of the device subsequent to acquiring a reference. The device 102 may be at rest in a resting position 104, for example, on a table or in any non-horizontal orientation. For example, the device 102 may be at rest if it remains substantially motionless for a predetermined time period. An arrow 106 indicating true north is also depicted to illustrate in this example that the device 102 is in an arbitrary resting position 104. The arrow 108 depicts a reference acquired in response to a determination that the electronic device 102 is at rest.

For inconspicuous and private convenience for the user in utilizing disclosed devices and method of devices, a resting position, for example, may be chosen by the user. It is understood that the resting position of the device need not be an arbitrary position and may be for example aligned with true north. As mentioned above, a reference, as illustrated by arrow 108 is acquired in response to a determination that the device 102 is at rest. A rest determination may be made in any suitable manner. For example, determining that the device is at rest may be determined by identifying that the electronic device has remained motionless for a predetermined time period, for example, 3 seconds. A motion sensor for example, may determine that the device is in motion. When the motion sensor ceases to sense motion for a predetermined period of time, a determination that the device 102 is at rest may be made. In another embodiment, determining that the device is at rest may be determined by sensing an orientation of the device and determining that the device has remained in the orientation for a predetermined period of time. It is understood that any manner in which determine that the device has remained motionless for a predetermined period of time is within the scope of this discussion.

Also, the acquired reference need not be arbitrary. The acquired reference may be, for example, true north as indicated by arrow 106. A directional compass, for example may be utilized to determine true north. Alternatively, the acquired reference may be a non-compass reference direction. For example, a non-compass reference direction may be determined by the direction in which the device 102 is pointed, or may be drawn from predetermined data stored for example, in a table of the device. It is understood that any manner in which to acquire a reference is within the scope of this discussion.

The arrow 110 depicts movement of the device 102. The movement may change the position or the orientation 104 of the device 102 to a new position or orientation 112 indicated by arrow 114 relative to the acquired reference 108. While the example movement 110 is depicted within a two-dimensional plane, any movement is within the scope of this discussion.

FIG. 2 again illustrates an acquired reference 208, as well as depicts movement 210 of the device 102 (see FIG. 1) subsequent to acquiring a reference 208 and the initiation of a non-display electronic function. As discussed above, the device 102 may acquire a reference 208 in any suitable manner. The device may provide an indicator such as a light or beep to indicate that the reference 208 has been acquired. Processing detected movement 210 to a new position 112 or orientation indicated by arrow 214 may initiate a non-display electronic function of the device 102 based upon the movement relative to the reference 208. Initiating a non-display electronic function of the electronic device may include at least one of executing a mode of the electronic device, executing an application of the electronic device or executing a feature of the electronic device 102. In this way, a subtle action by a user in moving the device 102 from its resting position or orientation 104 to a new position 112 or orientation 214 may inconspicuously and privately initiate a non-display electronic function of the device. As mentioned, the movement 210 may be any type of movement, for example a rotation or a lateral movement. The movement may furthermore be within a two-dimensional plane. The new position or orientation is of course an example of a position or orientation indicated by arrow 214 that may be assumed by the device 102 as a result of any type of movement 210. Furthermore, any manner in which to detect the movement of the device is within the scope of this discussion.

Figure 3:
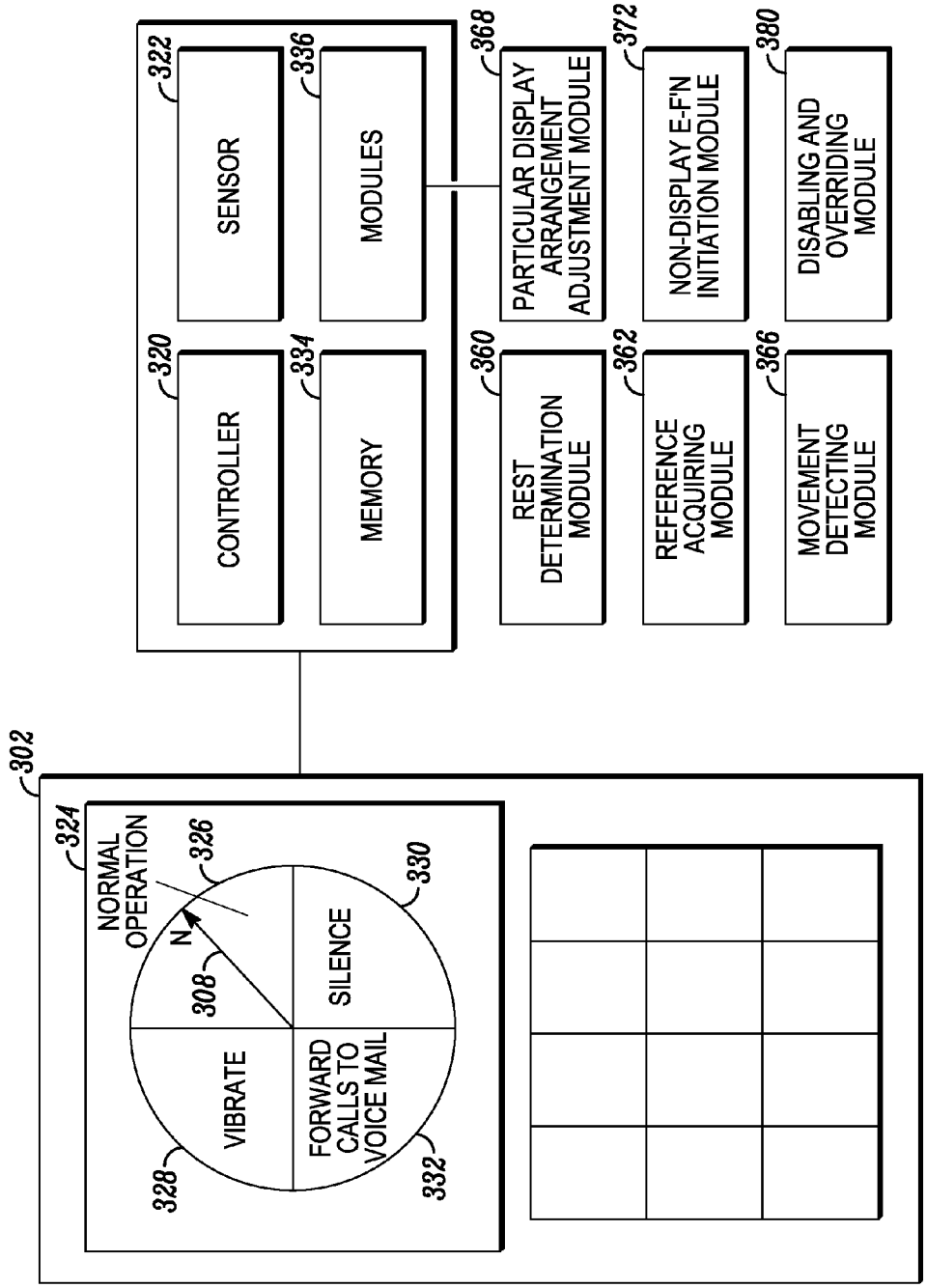
FIG. 3 depicts an embodiment of an electronic device that is capable of assuming a particular orientation and configured to execute non-display electronic functions.

FIG. 3 depicts an embodiment of an electronic device that is capable of assuming a particular orientation and configured to execute non-display electronic functions. The electronic device 302 includes, among many other components, a controller 320 that may be configured to process sensor signals and to execute electronic functions. As mentioned, the depicted electronic device is a mobile communication device. The mobile communication device 302 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The device 302 includes at least one sensor 322, for example, a motion sensor. A single sensor or a plurality of sensors may be configured to provide a motion signal to the controller 320 indicating, for example, that in the absence of motion the electronic device 302 is at rest. For example embedded touch sensors and an accelerometer may be used to determine that the device 302 is stationary. A single sensor 322 or a plurality of sensors may provide a reference signal to the controller 320 indicating a reference when the electronic device is at rest. For example, a directional single axis or dual axis compass may mark the initial device 302 orientation and provide an acquired reference. A single sensor 322 or a plurality of sensors may provide a movement signal to the controller 322 indicating movement of the electronic device subsequent to providing the reference signal. If the motion is rotation, for example, a compass, an accelerometer or angular accelerometer may be used. It is understood that any type of sensor and any combination of sensors may be used to determine rest, acquire a reference, and determine motion in accordance with this discussion.

Figure 2:
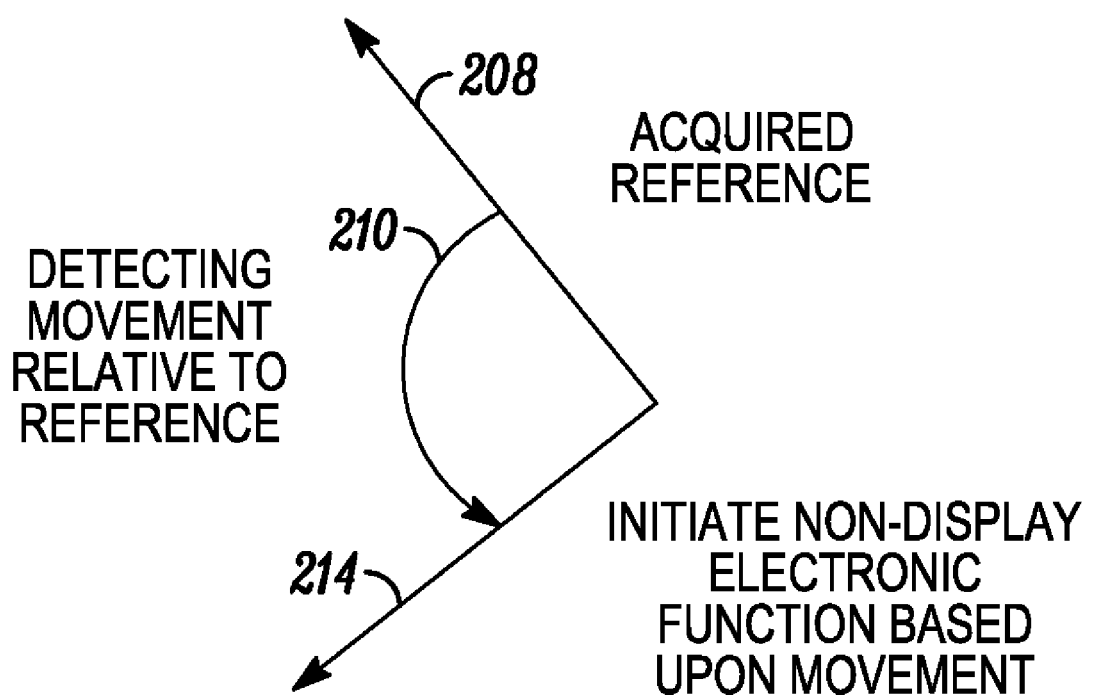
FIG. 2 again illustrates an acquired reference, as well as depicts movement of the device subsequent to acquiring a reference, and the initiation of a non-display electronic function.

As discussed above, the controller 320 may initiate a non-display electronic function of the electronic device 302 based upon the movement characteristic of the electronic device 302 relative to the reference (see FIGS. 1 and 2). The electronic device 302 may further include a display 324. When the device is determined to be at rest, and a reference is acquired, in preferred circumstances the device 302 may continue to be in its normal operation mode. Additionally the display 324 may exhibit in a particular display arrangement 326, at least one icon having a particular viewing orientation. In one embodiment, the particular display arrangement may be a circular display arrangement. In the depicted embodiment, the device display 324 may appear with marked reference and available features distributed around a circular display arrangement 326. It is understood that any particular display arrangement is within the scope of this discussion and other example display arrangements are described below.

In the depicted circular display arrangement 326, an arrow 308 with an acquired reference N for north, which may be a true or faux north, is depicted where it is indicated that normal operations may continue. As discussed, it is understood that the acquired reference may be any direction. If the phone orientation is not altered, or movement 210 (see FIG. 2) is not detected after the phone is determined to be at rest, the normal operation may continue. As discussed, a user may move, for example, rotate the mobile communication device 302 to an angle of interest. For example, were the user to turn the mobile communication device 90 degrees to the east, a preprogrammed or user programmed function may cause the mobile device to initiate vibrate mode 328. That is, once the user stops moving the device 302, the desired feature is selected. As discussed, in accordance with the disclosed devices 302 and methods, upon detecting movement 210 (see FIG. 2) of the electronic device 302 relative to the reference 308, a non-display electronic function such as vibrate 328 is initiated based upon the movement 210 of the electronic device 302 relative to the reference 308.

To interpret the movement of the mobile communication device 302 relative to the acquired reference, pointing the device 302 in a westerly direction for example, could mean to place the device in vibrate mode 328. Pointing the device 302 in a easterly direction may mean place the device in silence mode 330. Pointing the device 302 in a southerly direction may mean place forward calls to voice mail 332. A sensor reading, for example a compass reading may be taken at set interval to conserve power when the device 302 is stationary and not being carried by the user. When movement is detected 210 (see FIG. 2) after a reference is acquired, sensor readings may occur more frequently to determine, for example when the compass heading indicates a change.

The device may further include a memory 334 and modules 336 process instructions to carry out the above mentioned steps. Modules may include, for example, a rest determination module 360, a reference acquiring module 362, a movement detecting module 366, a particular display arrangement adjustment module 368, a non-display electronic function initiation module 372, and a disabling and overriding module 380. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

Figure 4:
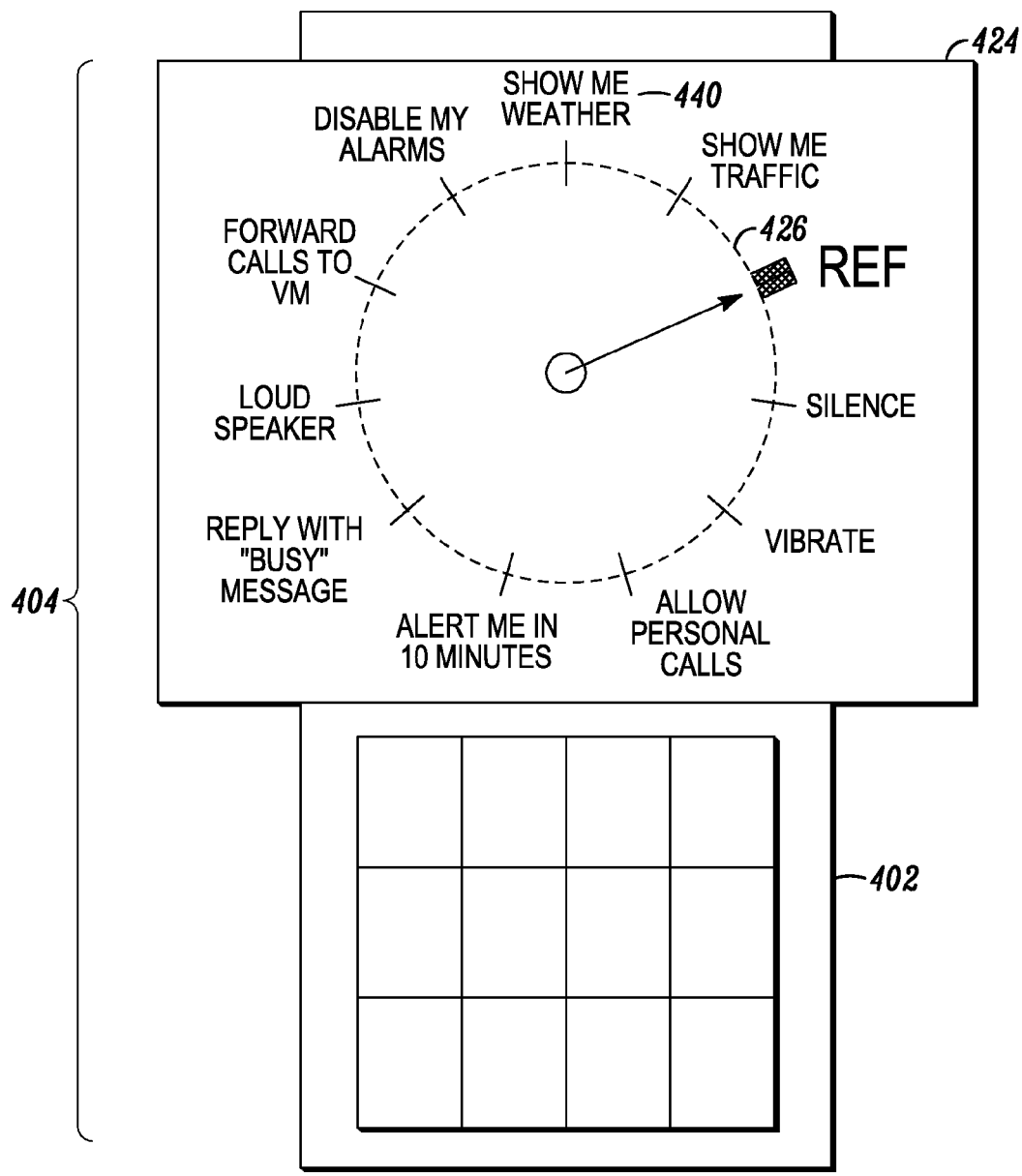
FIG. 4 depicts an embodiment of a mobile communication device with an expanded view of the display in a first orientation.
Figure 5:
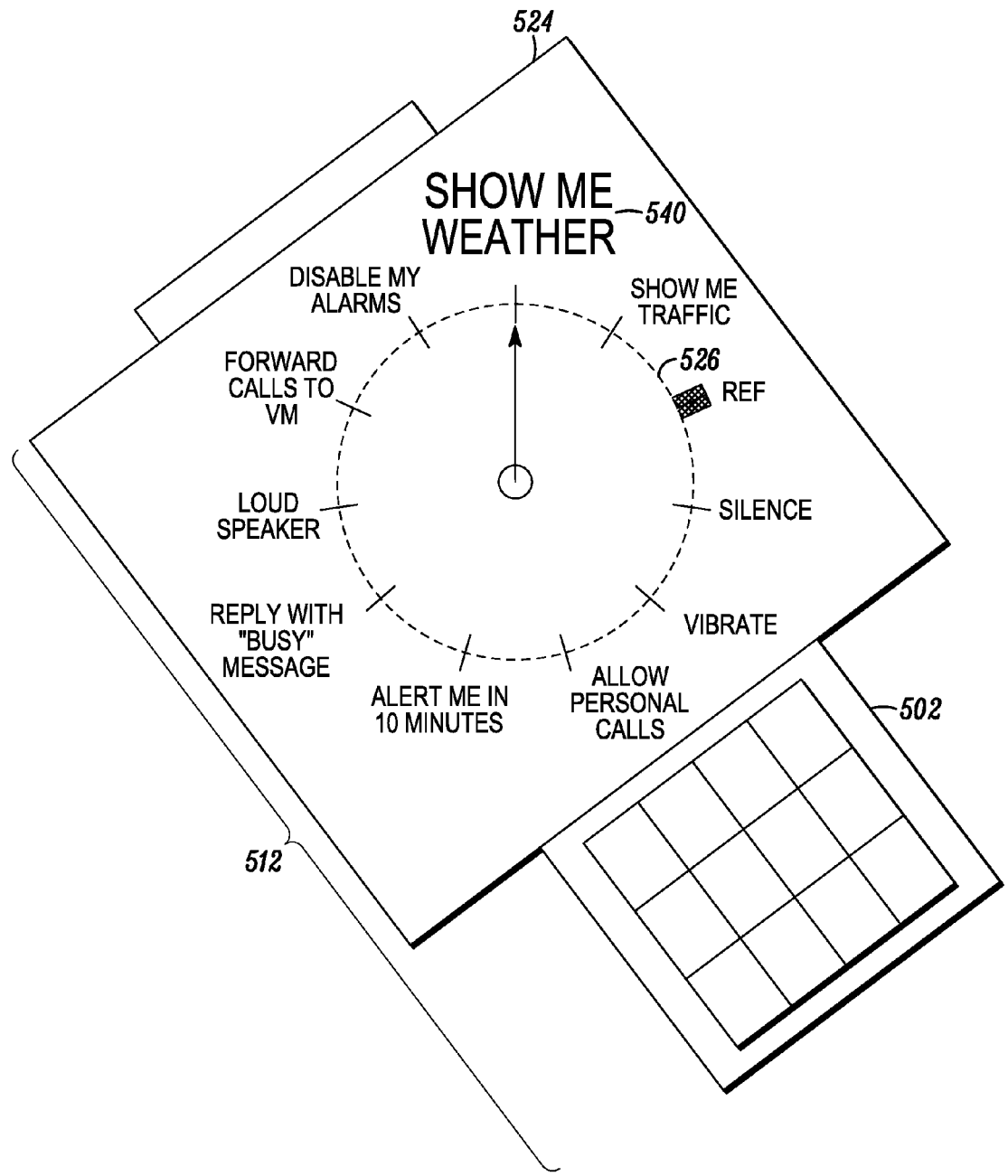
FIG. 5 depicts an embodiment of a mobile communication device after movement to a second orientation.

FIG. 4 depicts an embodiment of a mobile communication device 402 with an expanded view of the display in a first orientation 404. FIG. 5 depicts an embodiment of a mobile communication device 502 after movement to a second orientation 512. Referring to FIG. 4, also depicted is display 424 that illustrates another example of a particular display arrangement, here again a circular display arrangement 426. In this example, the choices are provided in a higher resolution than the example of FIG. 3, that is there are more choices of modes, applications and functions exhibited on the display 424. While in this example, a circular display arrangement is discussed, it is understood that any display arrangement is within the scope of this discussion. For example, a scrolling display arrangement may be exhibited (see FIGS. 6-8).

The disclosed devices and methods of a device may include a display 424 configured to display, in a particular display arrangement 426, at least one icon 440 having a particular viewing orientation, in this example, aligned generally horizontally with the orientation of the display 424. The depicted circular display arrangement 426 may be configured to move, for example, rotate on the display 424 in response to the controller 320 (see FIG. 3) receiving the movement signal, generated in response to movement in accordance with for example a movement detecting module 366, so that the at least one icon 440 maintains a particular viewing orientation. The device 402 in position 404 is depicted as being in a generally vertical orientation.

Referring to FIG. 5, the device 502 in position 512 is at a 45 degree angle to the vertical orientation of position 404 (see FIG. 4). It is understood that the movement between position or orientation 404 and 512 may be continuous. That is, the circular display arrangement 426 in position 404 is moved, for example, rotated in response to detecting movement of the electronic device 402 and 502 so that the at least one icon 440 maintains a particular viewing orientation in the display arrangement 526 in position 512. The icon of interest 540, "show me weather," may be still aligned generally horizontally upon the adjustment of the display and is depicted as being highlighted. The highlighting may be accomplished in any manner, including for example, color highlighting, extra brightness, a change from lower case letters to capital letters, font size changes, pop messages exhibited on the display, and/or audible clicks or other sounds. It is also understood that the icons may be other than alphanumeric characters. The adjustment of the circular display arrangement 426 to 526 may be continuous or substantially continuous, for example, depending on the processing power of the controller 320. It is understood that a particular display arrangement may also elliptical or any other similar or suitable arrangement. In one embodiment, once the desired feature is highlighted, the user may stop moving the device.

Different processes may take place while the device is in a particular mode, application or function. For example, the user may control the mobile communication device live or in real-time by moving the device during an incoming call. For example, a user can use motion, for example to answer a call, look at incoming caller ID and move the device to answer, forward, or reply.

Figure 6:
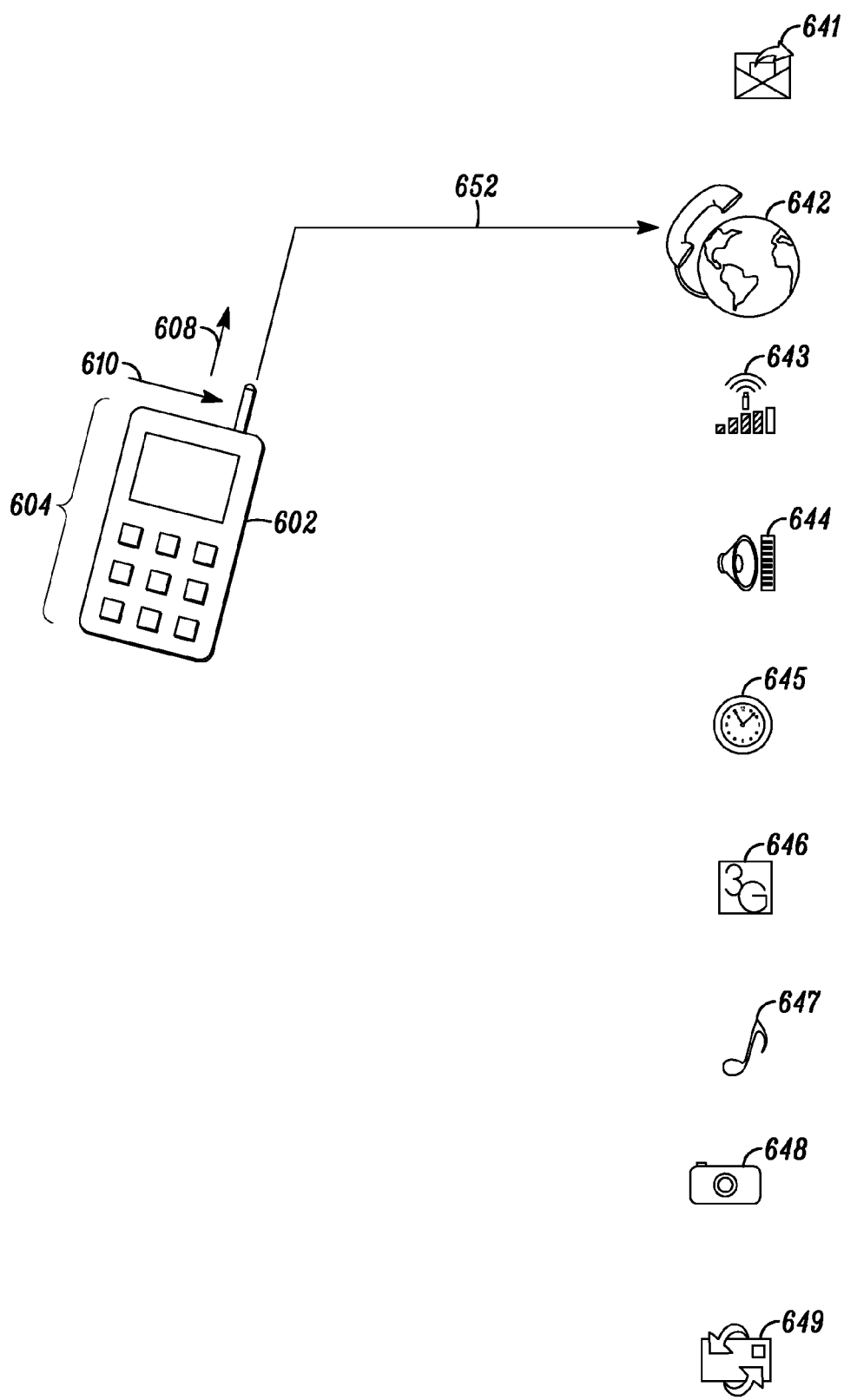
FIG. 6 depicts another embodiment of a mobile communication device utilizing icons and a scrolling display arrangement of the icons.

FIG. 6 depicts another embodiment of a mobile communication device utilizing icons 641, 642, 643, 644, 645, 646, 647, 648 and 649 and a scrolling display arrangement of the icons. Mobile communication device 602 may have a first orientation 604 and an acquired reference 608. The arrow 652 indicates that an icon 642 may be highlighted when the device is in a first orientation 604. The device may move in direction 610 that may be a linear movement, rotational movement, and/or any combination of movements. As the device is moved, in this example to the right, the mobile communication device 602, the highlighted icon may be changed.

Figure 7:
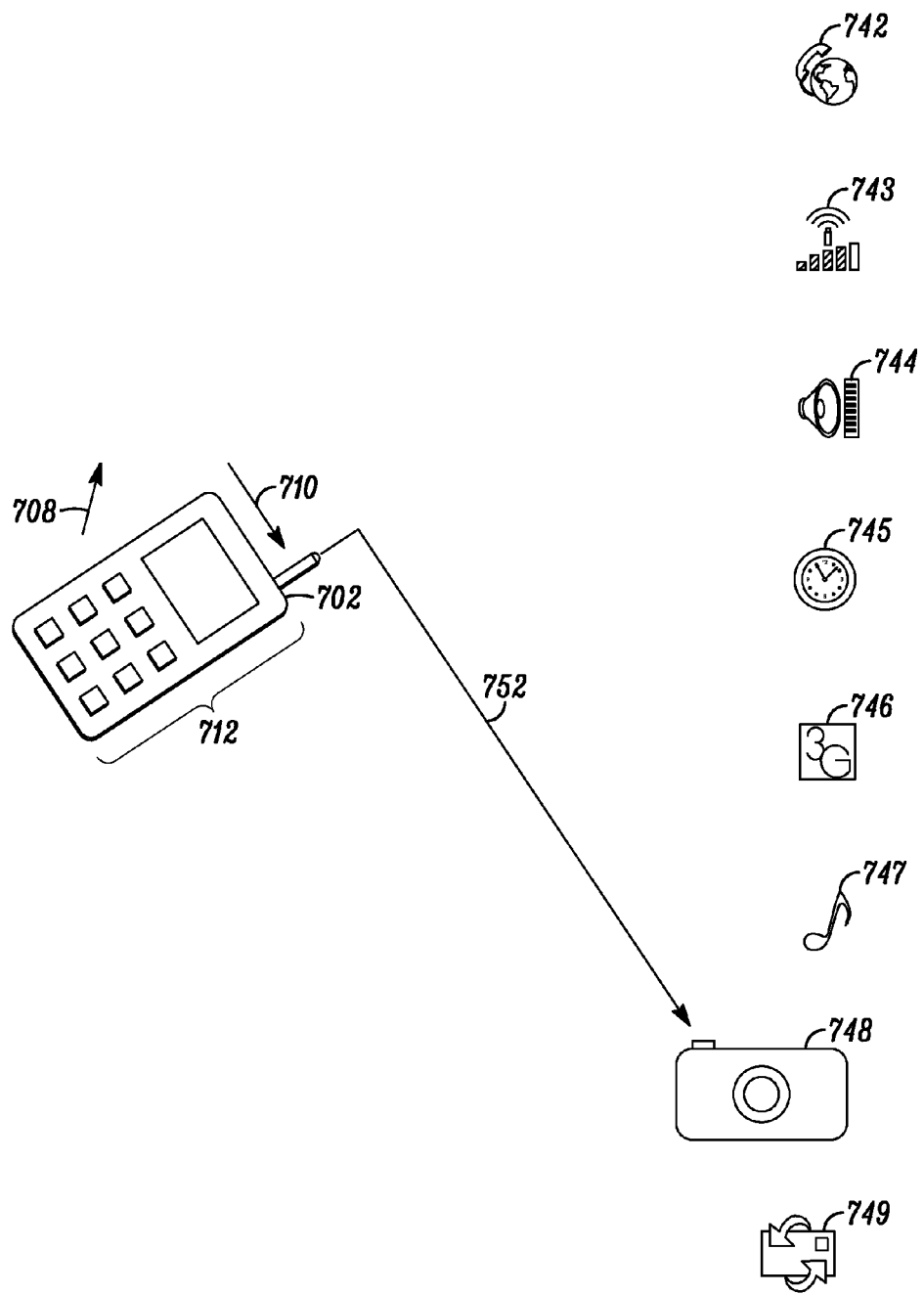
FIG. 7 depicts mobile communication device having icons and a scrolling display arrangement of the icons.

FIG. 7 depicts mobile communication device 702 and icons 742, 743, 744, 745, 746, 747, 748 and 749 and a scrolling display arrangement of the icons. The mobile communication device 702 may have a second orientation 712 with respect to the acquired reference 708 that is, having bee moved from the first orientation 604 of FIG. 6. The arrow 752 indicates that an icon 747 may be highlighted when the device is in a second orientation 712 upon movement in the direction 710. Again, as the device 602 is moved, the highlighted icon 747 of the scrolling display arrangement is changed, for example, sequentially in the order depicted.

Figure 8:
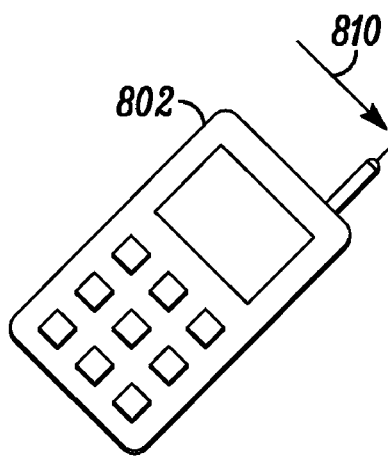
FIG. 8 depicts another embodiment of a mobile communication device showing alphanumeric indicators and a scrolling arrangement of the alphanumeric indicators.

FIG. 8 depicts another embodiment of a mobile communication device showing alphanumeric indicators 841, 842, 843, 844, 845, 846, 847, 848, 849 and 850 and a scrolling arrangement of the alphanumeric indicators. The device 802 may be in a particular orientation as determined by rest or by movement 810 upon acquiring a reference. In either event, the arrow 852 indicates that an alphanumeric indicator 845 may be highlighted during a scrolling display arrangement when the device is in an orientation.

It is understood that while the described particular display arrangements are illustrated in the figures, the depicted display arrangements may be either in the foreground of the display or the background of the display. Also, the described display arrangements may include multiple levels of menus. For example, after making one selection, the device may be moved again to make a sub-selection of that first selection. As mentioned above, the movement of the device after rest and after a reference is acquired, may be linear, however, rotational motion may be more simple to measure utilizing an accelerometer or a compass.

Figure 9:
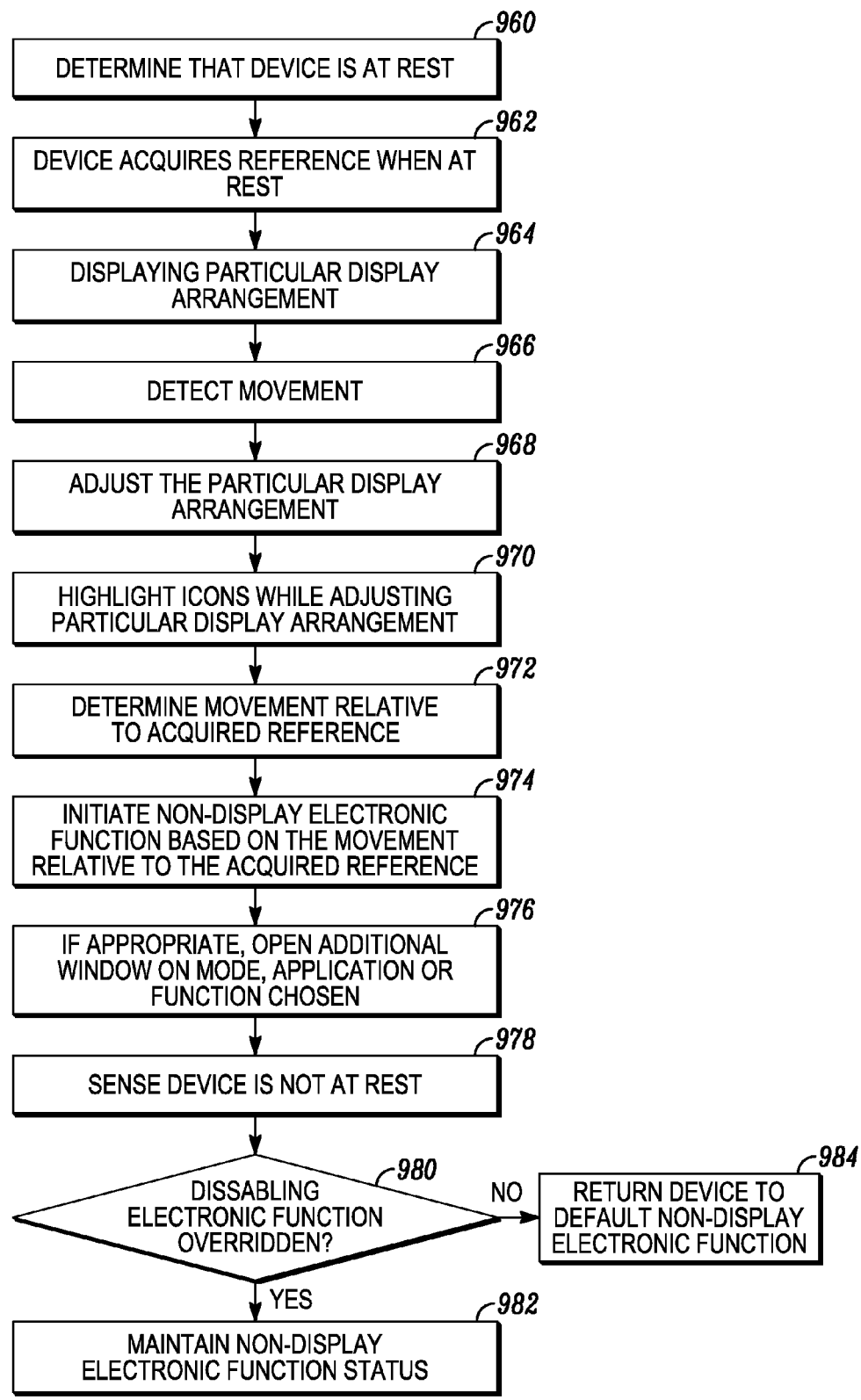
FIG. 9 is a flowchart of an embodiment of a method the disclosed devices.

FIG. 9 is a flowchart of an embodiment of a method the disclosed devices. As discussed above, the device 302 (see FIG. 3) may determine 960 that it is at rest in any suitable manner in accordance with the rest determination module 360. For example, determining that the electronic device 302 is at rest may include sensing an orientation of the device and determining that the device has remained in the orientation for a predetermined period of time. Alternatively, determining that the electronic device 302 is at rest may include identifying that the electronic device has remained motionless for a predetermined time period. When utilizing an accelerometer for determining rest, for example, no motion may be detected by the accelerometer, and therefore rest may be determined, based on a lapse of time.

User input may be utilized to determine rest and/or acquire a reference. In one embodiment, user input may be received by the device 302 (see FIG. 3), for example at the keypad to indicate the device is at rest. Additionally, the user input may indicate that the device is pointing in a reference direction, thus acquiring a reference. Alternatively, user input may indicate that the device 302 should determine a reference direction, thus acquire a reference.

The outer surface of the housing of the device 302 (see FIG. 3) may include touch sensors. For example, the sides of the housing may include touch sensors. As mentioned above, combinations of sensors may be utilized to determine rest and/or acquire a reference. For example, touch sensors may be used in combination with an accelerometer. In such an embodiment, even if the accelerometer detects no motion, it may be determined that the device is not be at rest if the touch sensors are in contact, for example, with human hands. In another embodiment may utilize an accelerometer for a determination that the device position is horizontal. For example, even if the accelerometer detects no motion, it may be determined that the device is not at rest if the device is not substantially horizontal. It is understood that the described manners in which to determine rest and acquire a reference are examples, and any suitable manner or manners are within the scope of this discussion.

Also as discussed above, the device may acquire a reference 962 when it determines that it is at rest in accordance with the reference acquiring module 362. The method may further include displaying a particular display arrangement 964 including any suitable display arrangement. When the device detects movement 966 in accordance with the movement detecting module 366, the particular display arrangement may be adjusted 968 in accordance with the particular display arrangement adjustment module 368. It is understood that any type of display arrangement may be altered in accordance with the movement detection 966. Icons may be highlighted, and/or other indicators may be utilized while rotating the display arrangement 970.

The movement of the device may be determined 972 relative to the acquired reference. A non-display electronic function may be initiated 974 based upon the determination 972 of the movement in accordance with the non-display electronic function initiation module 372. That is, when the user stops the movement of the device 302 (see FIG. 3) and a particular non-display electronic function is highlighted, that function may be enabled on the device. Depending upon the displayed modes, applications and functions, an additional window may be opened, and another non-display electronic function may be chosen 976. It is understood that the exhibited non-display electronic functions may be pre-programmed, downloaded or determined by user preference or installed in any other suitable manner.

In another embodiment, to prevent unintended and/or random false activation of a feature, once the reference is acquired 962, a predetermined period of time without motion may be processed before determining motion and then subsequently initiating of a non-display electronic function. Also, at any time during the disclosed process that the device senses movement is inconsistent with the process, or that it is not at rest 978, for example, because the device has been picked up by the user, the initiated function may be disabled. Alternatively, a user may wish to maintain the initiated function upon ending the disclosed process, by for example, picking up the device. The user may override disabling the initiated function. The device may determine 980 whether the user has overridden disabling the feature in accordance with the disabling and overriding module 380. In any suitable manner such as pushing a button on the device, or using a voice command processed by a voice recognition algorithm, a user can override disabling the initiated feature when the device is picked up and is no longer at rest. For example, if a user selected silence to initiate 974, the user can maintain 982 the silence feature after the user picks up the device and disengages the described process. If disengagement of the initiated 974 non-display electronic function is not overridden, the device may return 984 to its default non-display electronic function.

Motions that may be inconsistent with the disclosed process may include that the device has been picked up from the table or other surface on which it rests. In another embodiment where bumping the device is a concern, such an inconsistent movement may be overcome by use of an accelerometer/hysteresis with a timer to disregard any brief motions or movements detected after the reference is acquired by the device. It is understood that any type of sensors and processes may be utilized to determine whether the device is at rest, to acquire a reference, and to detect motion. Any compensation processes for unintended motions or movements are within the scope of this discussion.

Figure 10:
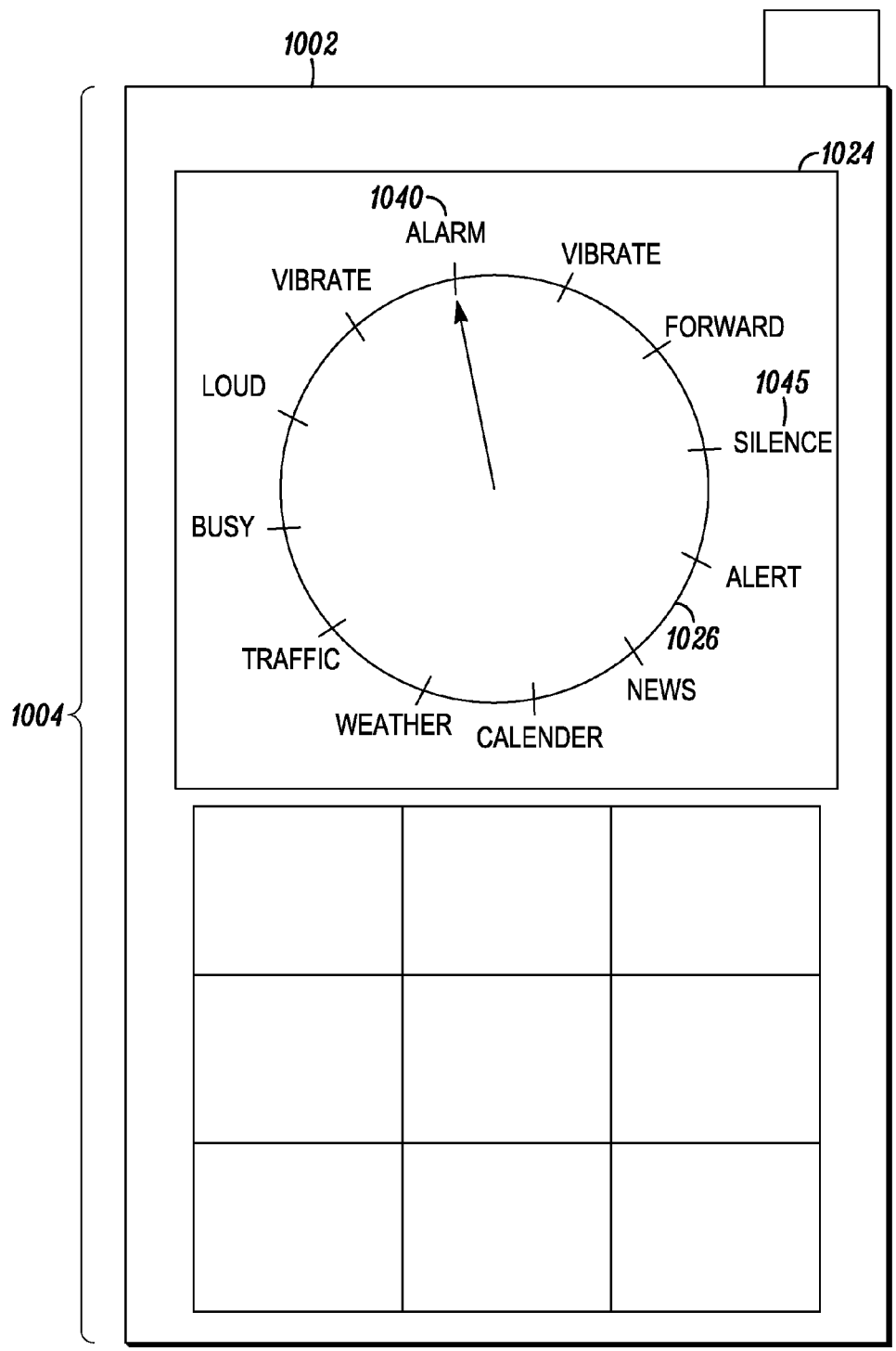
FIG. 10 depicts another embodiment of a mobile communication device with a view of the display in a first orientation.
Figure 11:
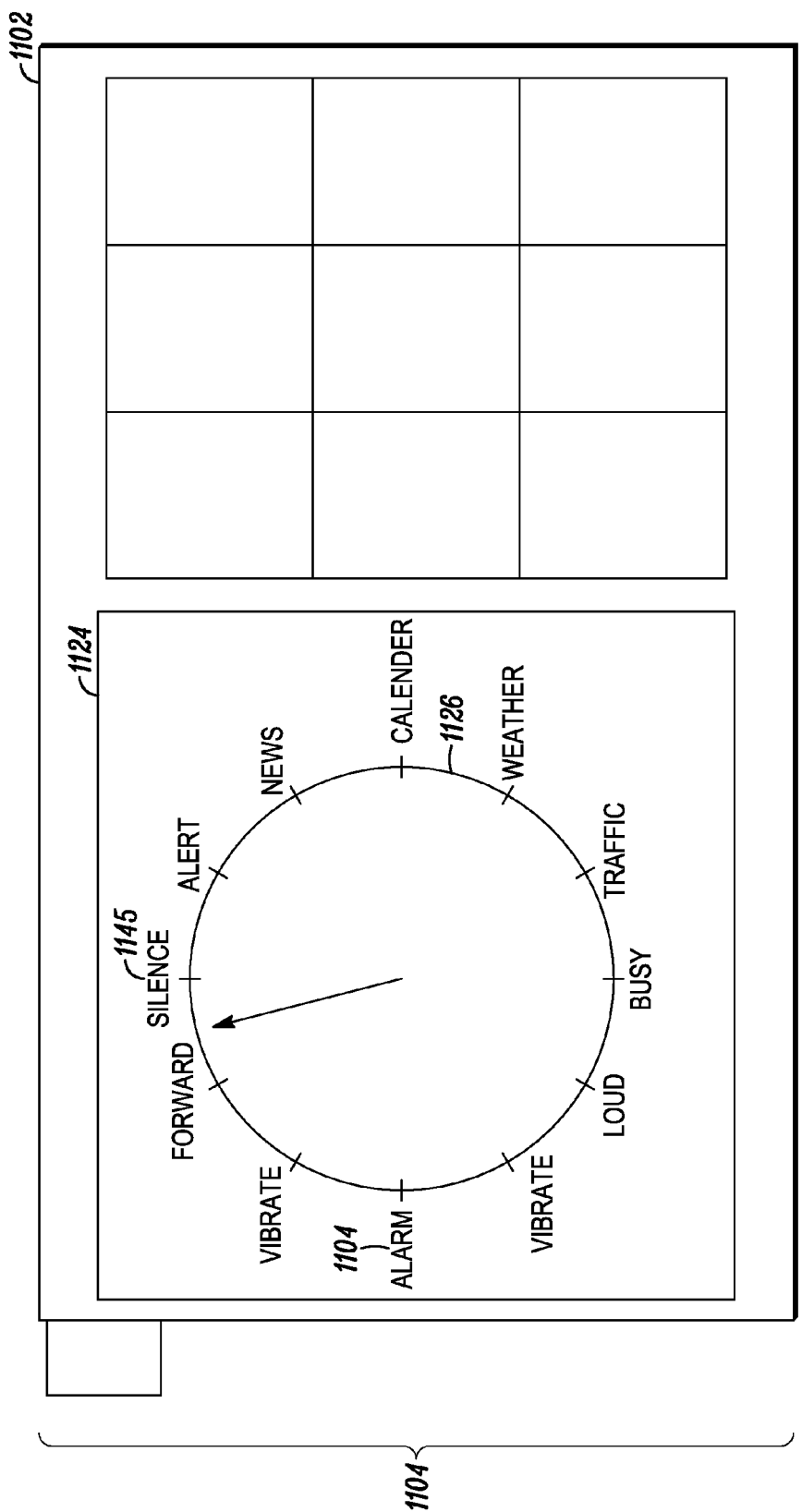
FIG. 11 depicts an embodiment of a mobile communication device after movement to a second orientation.

Referring to again to FIGS. 4 and 5, in conjunction with FIGS. 10 and 11, the feedback provided by an output component of the electronic device may differ from embodiment-to-embodiment. For the embodiments represented by FIGS. 4, 5, 10 and 11, the electronic device may comprise a display that is configured to display, in a particular display arrangement, a plurality of identifiers corresponding to non-display electronic functions. However, the embodiments may differ in that the display arrangement rotates or otherwise moves while the selected identifier maintains its position for some embodiments, whereas the selected identifier rotates or otherwise moves while the display arrangement maintains its position for other embodiments. For example, in FIGS. 4 and 5, the particular display arrangement is configured to adjust on the display in response to the controller receiving the movement signal, and a selection position is configured to maintain its position relative the display while changing from identifier to identifier. The selection position is the position where a selected identifier is visually identified to the user, such as highlighting, marking, changing the identifier size, changing the identifier orientation, and the like. As another example, in FIGS. 10 and 11, the selection position is configured to adjust on the display while changing from identifier to identifier in response to the controller receiving the movement signal, and the particular display arrangement is configured to maintain its position relative to the display. The particular display arrangement includes images, such as icons, and/or text that may correspond to the identifiers of the non-display electronic functions.

Referring specifically to FIGS. 4 and 5, the selection position of the plurality of identifiers may rotate with the electronic device as it changes from identifier to identifier, but the particular display arrangement of identifiers (shown by example as a circular list of functions) may maintain their geographic location relative to the surrounding environment. It is important to note that the perspective of the electronic device is different from the perspective of the user, because the user would not rotate his or her view with the electronic device as the device rotates. FIGS. 4 and 5 illustrate views from the perspective of a user. The particular display arrangement is aligned with the reference acquired when the electronic device was at rest, whereas the selection position rotates with the electronic device. For example, as illustrated in FIGS. 4 and 5, the focus of the electronic device 402, 502 changes from the reference "REF" acquired in the first orientation 404 to the "SHOW ME WEATHER" identifier 540 in the second orientation 512, thus following the movement of the electronic device. On the other hand, the particular display arrangement 426, 526 maintains its position relative to the reference (although changes relative to the electronic device 402, 502). For example, from the user's perspective represented by FIGS. 4 and 5, the "Show me weather", also shown as "SHOW ME WEATHER", identifier appears at the top of the circle in both orientations 404, 512. In contrast, from the perspective of the electronic 402, 502, as opposed to the perspective of the device and its reference as just described, the selection position moves with the device as it changes from identifier to identifier and thus maintains its position relative to the display, whereas the particular display arrangement rotates relative to the display.

Referring to FIGS. 10 and 11, the particular display arrangement of identifier may rotate with the electronic device, but the selection position of the plurality of identifiers may maintain their geographic location relative to the surrounding environment as it changes from identifier to identifier. The selection position is aligned with the reference acquired when the electronic device was at rest, whereas the particular display arrangement rotates with the electronic device. For example, as illustrated in FIGS. 10 and 11, the focus of the electronic device 1002, 1102 is maintained relative to the reference (although changes relative to the electronic device 1002, 1102) from the "Alarm" identifier acquired in the first orientation 1004 to the "Silence" identifier 1145 in the second orientation 1104. On the other hand, the particular display arrangement 1026, 1126 rotates as the electronic device is rotated, thus following the movement of the electronic device. For example, from the user's perspective represented by FIGS. 10 and 11, the "Alarm" identifier 1040 appears at the top (and little to the left) of the circle in the first orientation 1004 whereas the "Silence" identifier 1145 at that position in the second orientation 1104. In contrast, from the perspective of the electronic 1002, 1102, the particular display arrangement moves with the device and thus maintains its position relative to the display, whereas the selection position rotates relative to the display as it changes from identifier to identifier.

FIG. 11 illustrates an embodiment representing identification of a selection position 1145 by special orientation of the selection position relative to other identifiers of the particular display arrangement 1126. Generally, for this embodiment, the text portions of the display arrangement 1126 rotate with the electronic device such that, after some rotation, the text portions are no longer aligned with the view of a user. The exception is the selection position, for example the "Silence" identifier 1145 shown in FIG. 11, is maintained relative to its original orientation established when the device 1102 is at rest. The original orientation of the selection position may be based on a default orientation of the display when determining that the electronic device is at rest or based on the reference acquired in response to determining that the electronic device is at rest.

Figure 12:
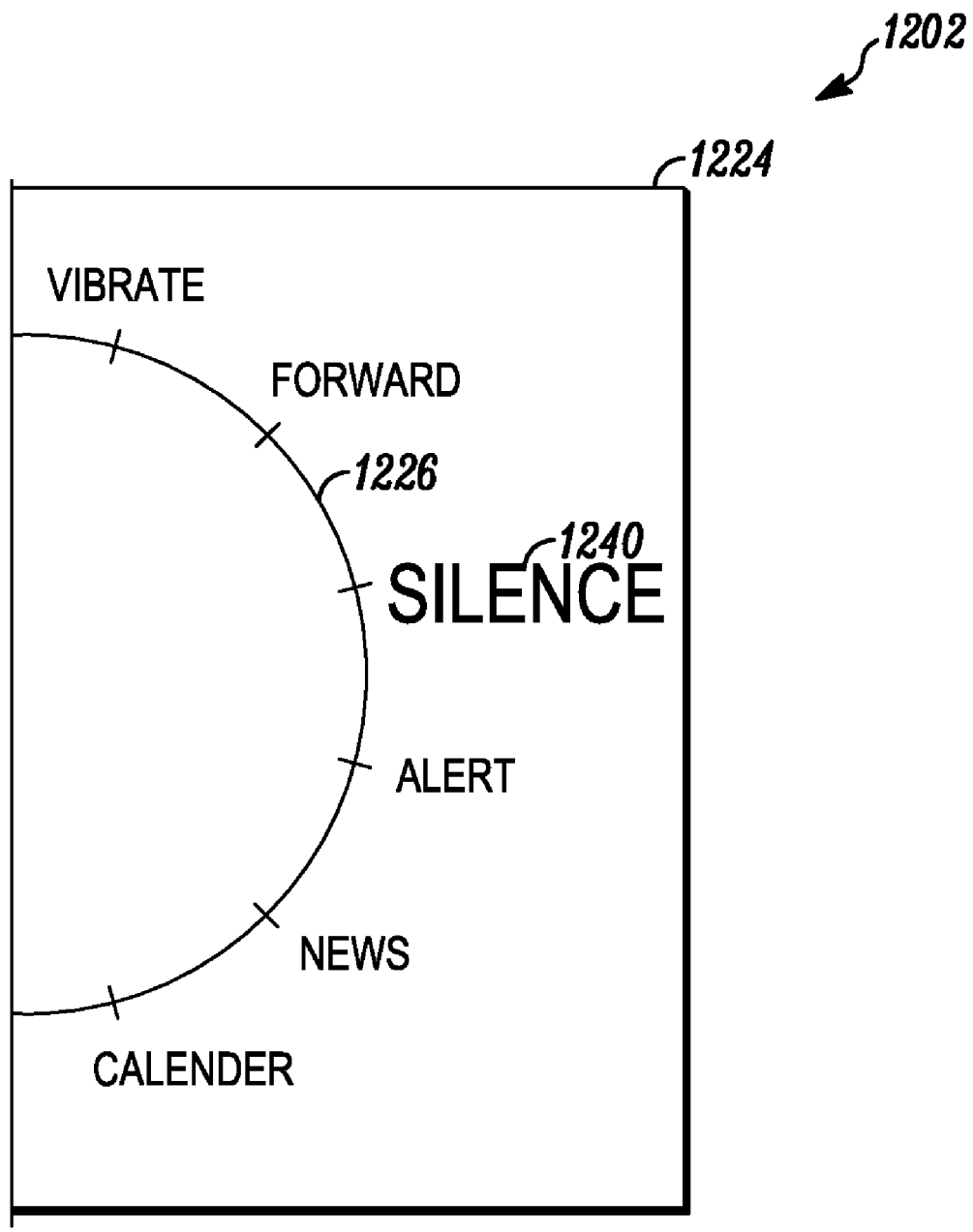
FIG. 12 depicts yet another embodiment of a mobile communication device with a view of the display.

Referring to FIG. 12, there is shown yet another embodiment in which the particular display arrangement is a partial segment 1202 of a circular arrangement 1226. The segment 1202 includes a plurality of identifiers corresponding to non-display electronic functions positioned about the segment, in which a selection position 1240 is identified.

Several of the embodiments described herein provide changing selection from one identifier to another by rotating or otherwise moving the mobile communication device. It is to be understood that other selections may be utilized. For example, as an alternative, the display of the mobile communication device may change selection from one identifier to another identifier in response to a user input, such as sensing a tap at its outer surface. The user input may be sensed at a user interface, such as a touch screen, or some other type of touch-sensitive component of the wireless communication device. As another example, the display of the mobile communication device may change selection from one identifier to another identifier in response to detecting movement by a motion sensor of the wireless communication device, such as an accelerometer. For one embodiment, the motion sensor may detect a tap by the user at the device's outer surface.

The disclosed are devices and methods of an electronic device configured to adaptably process arbitrary conditions to provide a user options for initiating or activating a non-display electronic function of the device. To determine in real-time arbitrary conditions of the device, the disclosed methods include determining that the electronic device is at rest and then acquiring a reference in response to determining that the electronic device is at rest. In this way, the device may assume any position or orientation to acquire a reference. Movement of the electronic device relative to the acquired reference is detected to initiate a non-display electronic function of the electronic device. In this manner, real-time arbitrary conditions are adaptably processed so that a user is free to determine how to position or orient the device to activate non-display electronic functions, and therefore may make non-display electronic function choices inconspicuously and privately.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of an electronic device configured to execute non-display electronic functions, the method comprising:
   determining that the electronic device is at rest;
   acquiring a reference in response to determining that the electronic device is at rest;
   detecting movement of the electronic device relative to the reference subsequent to acquiring the reference; and
   initiating a non-display electronic function of the electronic device based upon the movement of the electronic device relative to the reference.

2. The method of claim 1, wherein acquiring a reference includes acquiring the reference based on a directional compass.

3. The method of claim 1, wherein detecting movement of the electronic device includes at least one of detecting a movement of the electronic device based on an accelerometer or a rotation of the electronic device based on a directional compass.

4. The method of claim 1, wherein the reference is associated with a north compass direction or a non-compass reference direction.

5. The method of claim 1, wherein initiating a non-display electronic function of the electronic device comprises at least one of executing a mode of the electronic device, executing an application of the electronic device or executing a feature of the electronic device.

6. The method of claim 1, further comprising:
   sensing that the electronic device is not at rest; and
   disabling the non-display electronic function unless overridden by a predetermined action.

7. The method of claim 1, wherein determining that the electronic device is at rest comprises:
   sensing an orientation of the device; and
   determining that the device has remained in the orientation for a predetermined period of time.

8. The method of claim 1, wherein determining that the electronic device is at rest includes identifying that the electronic device has remained motionless for a predetermined time period.

9. The method of claim 1, wherein the electronic device comprises a display, and the method further comprises:
   displaying, in a circular display arrangement, a plurality of identifiers corresponding to non-display electronic functions having a particular viewing orientation; and
   adjusting the circular display arrangement relative to the display in response to detecting movement of the electronic device, and maintaining a selection position relative to the display while changing from identifier to identifier.

10. The method of claim 1, wherein the electronic device comprises a display, and the method further comprises:
    displaying, in a circular display arrangement, a plurality of identifiers corresponding to non-display electronic functions having a particular viewing orientation; and
    adjusting a selection position relative to the display while changing from identifier to identifier in response to detecting movement of the electronic device, and maintaining the circular display arrangement relative to the display.

11. A method of an electronic device configured to execute non-display electronic functions, the method comprising:
    identifying that the electronic device has remained at a first orientation within a two-dimensional plane for a predetermined time period;
    detecting movement of the electronic device from the first orientation to a second orientation within the two-dimensional plane; and
    initiating a non-display electronic function of the electronic device in response to detecting movement of the electronic device from the first orientation to a second orientation.

12. The method of claim 11, wherein detecting movement of the electronic device from the first orientation to the second orientation within the two-dimensional plane is based on at least one of an accelerometer or a directional compass.

13. The method of claim 11, further comprising:
    sensing that the electronic device is not at rest; and
    disabling the non-display electronic function unless overridden by a predetermined action.

14. The method of claim 11, wherein the electronic device comprises a display, and the method further comprises:
    displaying, in a circular display arrangement, a plurality of identifiers corresponding to non-display electronic functions having a particular viewing orientation; and adjusting the circular display arrangement relative to the display in response to detecting movement of the electronic device relative to the reference, and maintaining a selection position relative to the display while changing from identifier to identifier.

15. The method of claim 11, wherein the electronic device comprises a display, and the method further comprises:
displaying, in a circular display arrangement, a plurality of identifiers corresponding to non-display electronic functions having a particular viewing orientation; and
adjusting a selection position relative to the display while changing from identifier to identifier in response to detecting movement of the electronic device, and maintaining the circular display arrangement relative to the display.

16. An electronic device that is capable of assuming a particular orientation and configured to execute non-display electronic functions, the electronic device comprising:
a controller configured to process sensor signals and to execute electronic functions; and
at least one motion sensor configured to provide a motion signal to the controller indicating that the electronic device is at rest, a reference signal to the controller indicating a reference when the electronic device is at rest, and a movement signal to the controller indicating movement of the electronic device subsequent to providing the reference signal,
wherein the controller initiates a non-display electronic function of the electronic device based upon the movement characteristic of the electronic device relative to the reference.

17. The device of claim 16, wherein the at least one motion sensor includes a compass configured to provide a reference signal to the controller.

18. The device of claim 16, wherein the at least one motion sensor includes at least one of an accelerometer or a compass configured to provide a movement signal to the controller.

19. The device of claim 16, wherein the reference is associated with a north compass direction or a non-compass reference direction.

20. The device of claim 16, wherein the non-display electronic function of the electronic device comprises at least one of a mode of the electronic device, an application of the electronic device or a feature of the electronic device.

21. The device of claim 16, further comprising:
a display configured to display, in a particular display arrangement, a plurality of identifiers corresponding to non-display electronic functions, the particular display arrangement being configured to adjust on the display in response to the controller receiving the movement signal, and a selection position being maintained relative the display while changing from identifier to identifier.

22. The device of claim 16, further comprising:
a display configured to display, in a particular display arrangement, a plurality of identifiers corresponding to non-display electronic functions, a selection position being configured to adjust on the display while changing from identifier to identifier in response to the controller receiving the movement signal, and the particular display arrangement being maintained relative to the display.

* * * * *